United States Patent [19]
Tang

[11] Patent Number: 5,654,938
[45] Date of Patent: Aug. 5, 1997

[54] METHOD FOR IDENTIFYING ALTERATION OF EARTH FORMATIONS USING DIPOLE ACOUSTIC LOGGING

[75] Inventor: Xiaoming Tang, Sugar Land, Tex.

[73] Assignee: Western Atlas International, Inc., Houston, Tex.

[21] Appl. No.: 657,794

[22] Filed: May 31, 1996

[51] Int. Cl.$^6$ ................................................ G01V 1/40
[52] U.S. Cl. ................................ 367/34; 367/28; 367/30; 367/32; 364/422
[58] Field of Search ................................ 362/25–32, 34, 362/35; 364/422

[56] References Cited

U.S. PATENT DOCUMENTS

| | | | |
|---|---|---|---|
| 4,672,588 | 6/1987 | Willen | 367/30 |
| 4,703,460 | 10/1987 | Kurkjian et al. | 364/422 |
| 4,819,214 | 4/1989 | Gutowski et al. | 367/27 |
| 5,077,697 | 12/1991 | Chang | 367/31 |
| 5,197,038 | 3/1993 | Chang et al. | 367/28 |
| 5,541,890 | 7/1996 | Tang | 367/34 |

OTHER PUBLICATIONS

Tang et al, 62nd Annu. S&G Int. Mtg, pp. 205–208, Oct. 25, 1992; abst. only herewith.

*Primary Examiner*—Nelson Moskowitz
*Attorney, Agent, or Firm*—Richard A. Fagin

[57] ABSTRACT

A method for detecting alteration of earth formations penetrated by a wellbore. The method includes determining a first arrival velocity of dipole acoustic energy propagated through the earth formations. A first frequency dependent velocity of the dipole acoustic energy is then determined. A first dispersion characteristic is determined from the difference between the first arrival and frequency dependent velocities. The method includes determining a frequency dependent velocity and a first arrival velocity for synthesized waveforms for an unaltered formation. The synthesis uses the first arrival velocity of the dipole acoustic energy as a shear velocity. A second dispersion characteristic, related to a difference between the frequency dependent velocity and the first arrival velocity of the synthesized waveforms is determined. The alteration is detected by finding a difference between the first dispersion characteristic and the second dispersion characteristic. In a preferred embodiment, the frequency dependent velocity includes a peak energy velocity determined by waveform matching the receiver signals.

7 Claims, 4 Drawing Sheets

METHOD FOR IDENTIFYING ALTERATION OF EARTH FORMATIONS USING DIPOLE ACOUSTIC LOGGING

BACKGROUND OF THE INVENTION

1. Field of the Invention

The invention is related to the field of acoustic velocity well logging of earth formations. More specifically, the invention is related to methods of determining changes in acoustic velocity of the earth formations which may be caused by mechanical and chemical alteration related to drilling a wellbore through the earth formations.

2. Description of the Related Art

Wellbores are drilled through earth formations for, among other reasons, extracting useful materials such as petroleum. Wellbores are usually drilled through the earth formations using a rotary drilling rig. The rig is used to turn a drill bit which cuts away at the earth formations. Commercial drill bits typically cut through the earth formations either by shearing or by compressively fracturing the earth formations. When a wellbore is drilled it is usually filled with a liquid suspension called "drilling mud", which is used to hydraulically clear away cuttings generated by the drill bit and by hydrostatic pressure to prevent pressurized fluids present in the pore spaces of the earth formations from entering the wellbore in an uncontrolled manner.

The drilling mud typically includes water as the continuous liquid phase and includes a number of chemical additives to reduce the effects of water on certain earth formations which may be reactive with water. The action of the drill bit in shearing or compressively fracturing the formations, combined with chemical action of the drilling mud on some earth formations, can change the acoustic velocity of some earth formations in the vicinity of the wellbore.

If the acoustic velocity has been changed in some formations as a result of the drilling process, it can be more difficult, for example, to correlate acoustic velocity well logs made in such formations to surface seismic surveys. Changes in acoustic velocity can also correspond to formations which are highly sensitive to the drilling process and may be mechanically unstable after drilling. Such mechanically unstable formations may be prone to "washing" or "caving" which can increase the risk of the drilling assembly becoming stuck in the wellbore. Such mechanically unstable formations may also be prone to production of formation solids during extraction of the petroleum, which can cause fouling or damage to production equipment.

Formation alteration has been associated with changes in the shear wave velocity in the vicinity of the wellbore wall. Changes in shear velocity in turn result in changes in dispersion properties of dipole acoustic waves propagating through such altered formations. See for example, P. Wu, D. Scheibner and W. Borland, *A Case Study of Near-Borehole Shear Velocity Alteration*, Paper R, Transactions of the 34th Annual Logging Symposium, Society of Professional Well Log Analysts, Houston, Tex., 1993. It has also been observed that a "pressurized" wellbore may, as to some altered earth formations, exhibit less dispersion of dipole acoustic waves than would be the case for a similar composition unaltered formations. See for example, B. K. Sinha and Q. -H. Liu, *Flexural Waves in a Pressurized Borehole: A Finite Difference Approach*, Expanded Abstracts p. 26–29, 65th Annual International Meeting, Society of Exploration Geophysicists, 1996.

It is an object of the invention to provide a method of signal processing for a dipole acoustic well logging instrument which can be used to identify earth formations which have been altered by the drilling process, by means of determining changes in the dispersion-inducing properties of the earth formations.

SUMMARY OF THE INVENTION

The invention is a method for detecting alteration of earth formations penetrated by a wellbore. The method includes determining a first arrival velocity of dipole acoustic energy propagated through the earth formations. A frequency dependent velocity of the dipole acoustic energy is then determined. In a preferred embodiment, the frequency dependent velocity includes a peak energy velocity determined by matching signal waveforms of the dipole acoustic energy. A first dispersion characteristic related to a difference between the first arrival velocity and the first peak energy velocity is determined. The method includes determining a frequency dependent velocity and a first arrival velocity for synthesized waveforms for an unaltered formation. In the preferred embodiment, the frequency dependent velocity of the synthesized waveforms includes the peak energy velocity determined by waveform matching. The synthesis uses the previously determined first arrival velocity of the dipole acoustic energy as a shear velocity. A second dispersion characteristic, related to a difference between the frequency dependent velocity and the first arrival velocity of the synthesized waveforms is then determined. The alteration is detected by finding a difference between the first dispersion characteristic and the second dispersion characteristic.

DESCRIPTION OF THE PREFERRED EMBODIMENT

Figure 1:
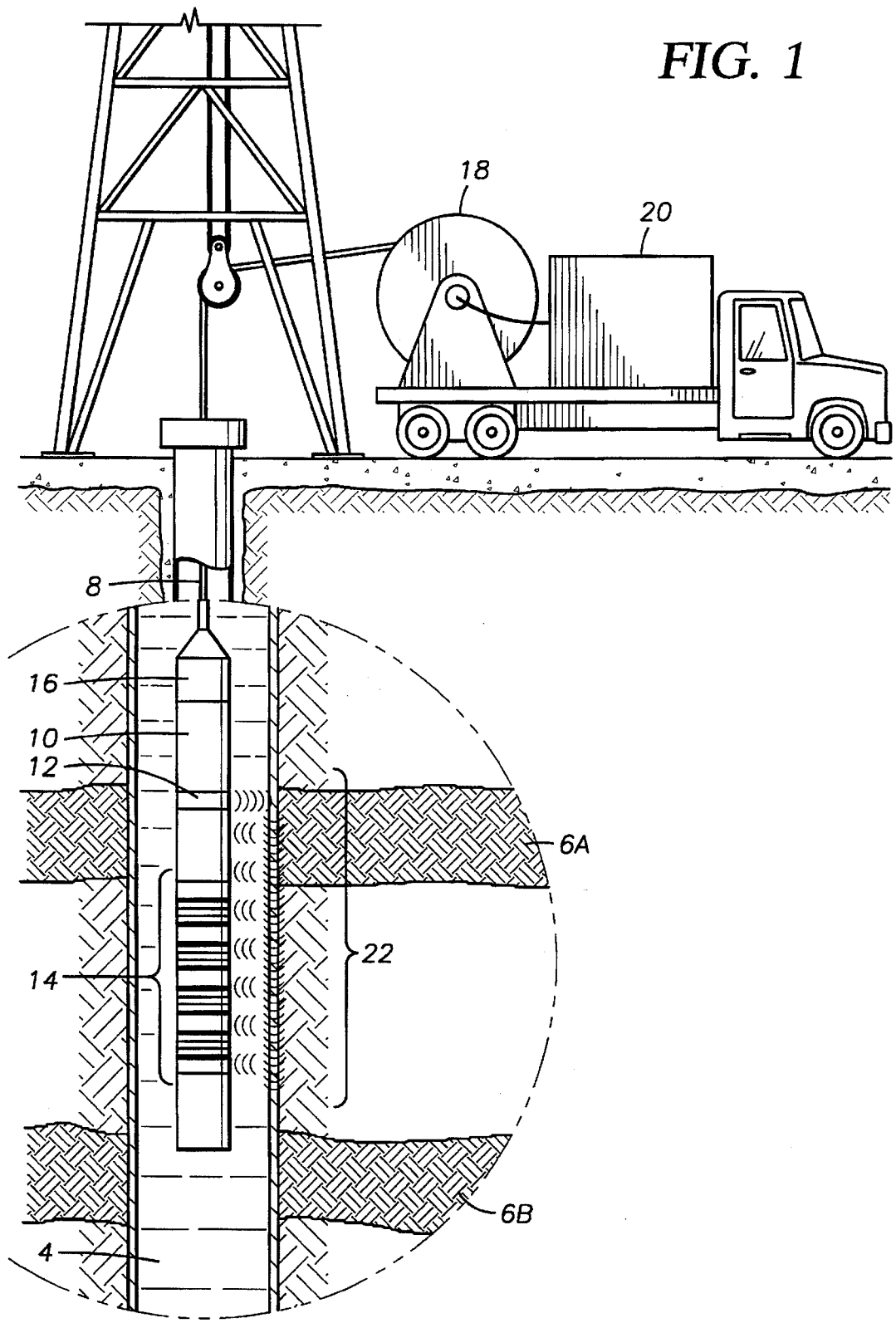
FIG. 1 shows a dipole acoustic well logging instrument disposed in a wellbore.

In order to determine alteration of earth formations, the invention can use signals generated by a dipole acoustic well logging instrument. The logging instrument is disposed in a liquid-filled wellbore drilled through the earth formations. Dipole acoustic well logging instruments which can be used to practice the method of the invention are known in the art. One such acoustic well logging instrument is described, for example in *Multipole Array Acoustilog*, Western Atlas Logging Services, Houston, Tex., 1991. FIG. 1 shows the acoustic logging instrument 10 suspended in the wellbore 2 at one end of an armored electrical cable 8. The cable 8 can be extended into and withdrawn from the wellbore 2 by means of a winch 18 or similar spooling device known in the art. The surface end of the cable 8 is typically electrically connected to a recording unit 20, which optionally can include a computer (not shown separately) for performing the method of the invention.

The acoustic logging instrument 10 can include a dipole transmitter 12 which is periodically energized to emit pulses of acoustic energy 22 into the fluid 4 in the wellbore. The acoustic energy pulses 22 typically travel outward and then propagate along the wellbore 2 wall. The energy pulses 22 can eventually reach receivers 14 positioned at axially spaced apart locations along the instrument 10. The receivers 14 generate electrical voltage signals in response to the detected acoustic energy pulses 22. The acoustic characteristics of the transmitter 12 and the receivers 14 are explained in the *Multipole Array Acoustilog* reference, supra.

The acoustic logging instrument 10 can also include a telemetry/signal processing unit 16 which imparts signals to the cable 8. The signals imparted to the cable 8 can correspond to the receiver 14 electrical voltage signals, either in analog, or preferably in digital form. The signals imparted to the cable 8 can be decoded and interpreted in the recording unit 20. Alternatively, the telemetry/signal processing unit 16 can record the electrical voltage signals, and/or can perform the process of the invention. It is to be understood that a general purpose computer (not shown separately in FIG. 1) can be programmed to perform the process of the invention. This general purpose computer (not shown) can form part of the telemetry/signal processing unit 16 or can form part of the recording unit 20. The general purpose computer (not shown) can also be located remotely from the wellbore 2. The location at which the process is performed, either in the logging instrument 10 itself or at the earth's surface, is a matter of convenience for the system designer and is not to be construed as a limitation on the invention.

Figure 3:
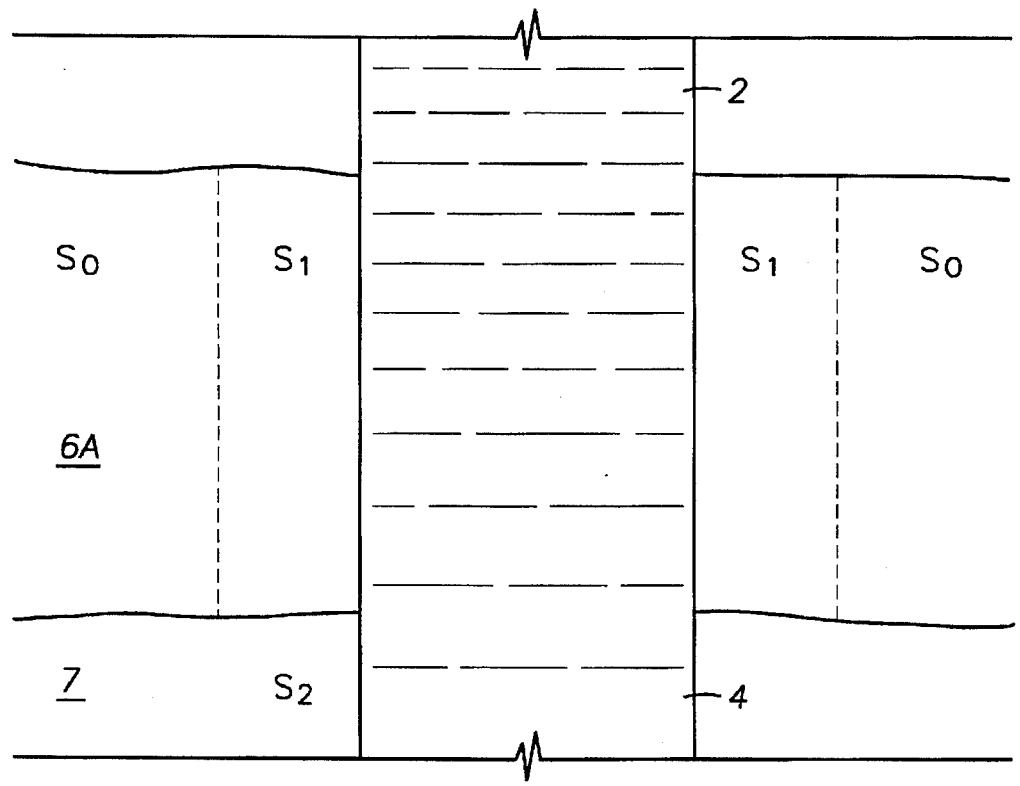
FIG. 3 shows two earth formations penetrated by the wellbore, the first having an altered zone and the second being unaltered.

FIG. 3 shows the earth formations 6A and 7 in more detail, these formations previously having been shown in FIG. 1, so that the method of the invention can be better understood. The wellbore 2, having the fluid 4 therein, is shown penetrating formation 6A and 7. Formation 6A has been altered by the process of drilling the wellbore 2. The alteration is shown as formation 6A having two discrete zones, substantially concentrically disposed around the wellbore 2, each one of the zones having a different shear wave velocity. For example, the zone radially nearest that wellbore 2 can have a shear wave velocity represented by $S_1$, and the outermost zone can have a different shear wave velocity represented by $S_0$. The outermost zone, represented by $S_0$, is unlikely to be substantially altered by the process of drilling the wellbore 2. Alteration of the formation 6A near the wellbore 2 wall can occur as a result of mechanical degradation by the action of a drill bit used to cut through the formations 6A, 7. Alteration is also known to occur as a result of chemical interaction between fluid sensitive minerals in the formation 6A and the fluid 4 in the wellbore 2. As a practical matter, the earth formations actually penetrated by wellbores may include a gradual transition from the altered zone $S_1$ to the unaltered zone $S_0$, in contrast to the sharp boundary therebetween as shown in FIG. 3. The configuration in FIG. 3 represents a simplified model used to perform the method of the invention. Other formations may remain substantially unaltered by the drilling process. Formation 7 represents such a formation which is substantially unaltered and is therefore shown as having only one shear wave velocity $S_2$.

Dipole acoustic waves propagating along a wellbore are dispersive in nature, meaning that the velocity of the acoustic waves is dependent on the frequency. As represented in the time domain, different portions of the dipole wave travel at different velocities. The initial portion of the wave typically travels at the fastest velocity. Later portions of the waveform typically travel at successively slower velocities. The amount of change in velocity with respect to frequency, meaning the degree of dispersion, is primarily related to the shear wave velocity of the earth formation. If the shear velocity of the formation proximal to the wellbore has changed due to alteration, the dipole wave dispersion characteristics will be somewhat different from those of an unaltered formation. The invention can be used to identify altered zones by determining whether the dispersion characteristics of dipole waves have changed relative to an unaltered formation.

Figure 2:
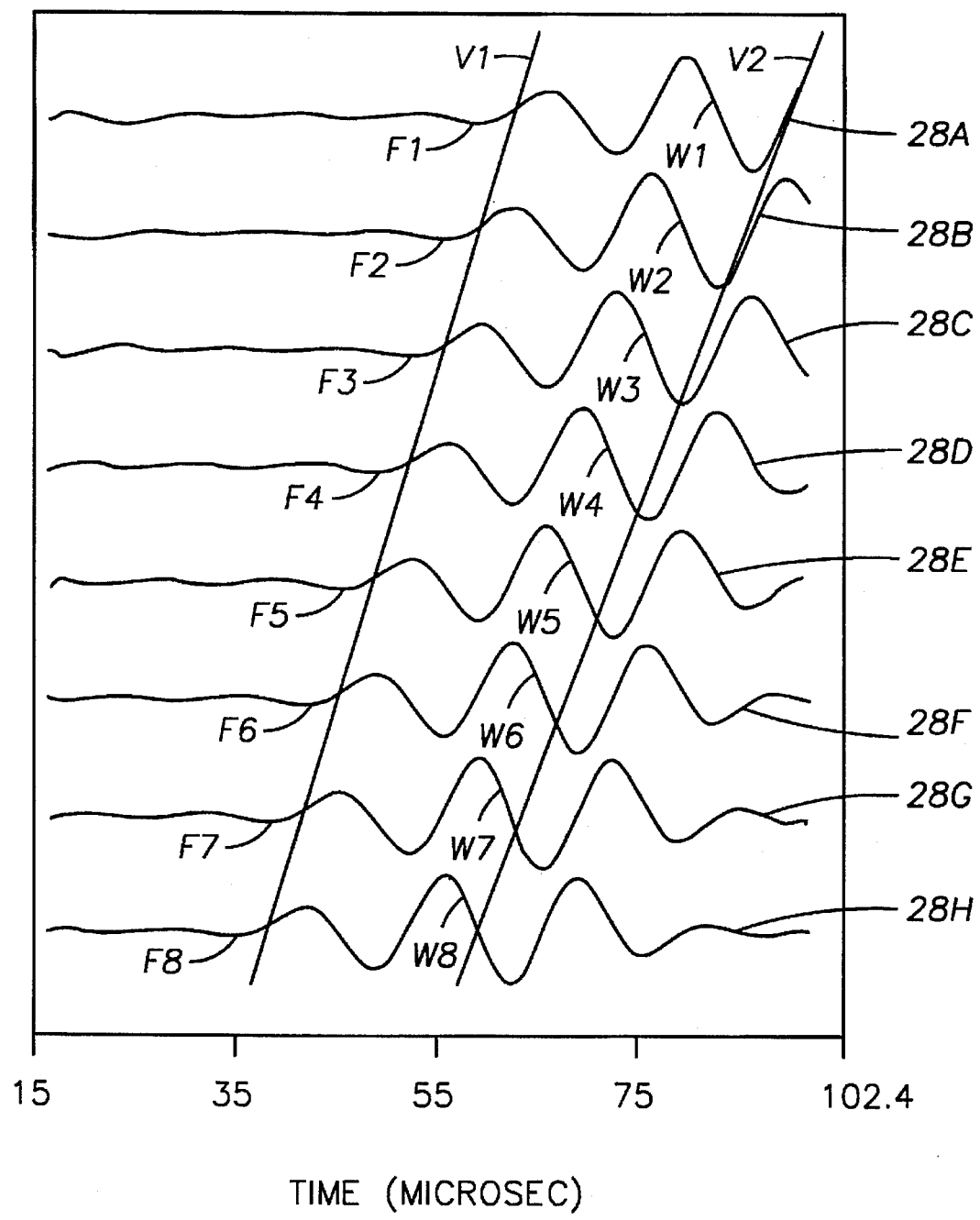
FIG. 2 shows waveforms of signals generated by receivers on the instrument of FIG. 1.

FIG. 2 shows a graph of typical electrical voltage signals generated by the receivers (14 in FIG. 1) in response to detection of the acoustic energy pulses (22 in FIG. 1). Curves 28A–28H, called signal waveforms, correspond individually to the voltage signals generated by each of the receivers 14 (which in the present embodiment can be eight in number) included on the acoustic logging instrument (10 in FIG. 1). Each waveform 28A–28H is positioned along the ordinate axis corresponding to the axial location of the particular receiver 14 to which each waveform 28A–28H is related. Each signal waveform 28A–28H generally includes a time at which the receiver 14 first responds to the acoustic energy propagated along the wall of the wellbore 2, this time generally being called the "first arrival". For waveform 28A the first arrival is shown at F1. Corresponding first arrivals are shown at F2–F8 for the other waveforms 28B–28H. It should be noted that the receivers 14 described in the *Multipole Array Acoustilog* reference, supra have the advantage of being primarily sensitive to flexural waves propagated along the wellbore 2 and being substantially insensitive to "multipole" or compressional energy. The first arrivals F1–F8 on these waveforms 28A–28H will therefore be substantially time coincident with the first arriving acoustic energy which is propagated as flexural waves. The time, relative to the actuation of the transmitter 12, at which the first arrival takes place depends on both the acoustic velocity of the formation (such as 6A and 6B in FIG. 1) positioned between the transmitter 12 and the individual receiver 14, and on the axial spacing of the individual receiver 14 from the transmitter 12. If the receivers 14 are evenly axially spaced apart from each other, the first arrivals F1–F8 when displayed on a graph such as the one in FIG. 2 will typically occur on a line V1 having a characteristic slope corresponding to the flexural acoustic velocity in the wellbore penetrating the earth formation. Methods of determining the flexural acoustic velocity from the times of the first arrivals F1–F8 is well known in the art. As has been shown by numerical simulation of acoustic waves, the time of the first arrival corresponds to the component of the wave which penetrates most deeply into the earth formation from the wall of the wellbore and therefore has the highest velocity of any component in the entire waveform 28A–28H.

A substantial portion of the total acoustic energy detected in the energy pulse (22 in FIG. 1) by each receiver 14, however, is represented in a later portion of each waveform 28A–28H, these later portions being shown at W1–W8. The later portions W1–W8 can have substantially higher overall amplitude than the first arrivals, and can have a different characteristic acoustic velocity for any mode of propagation (such as the flexural waves shown in FIG. 2) than the acoustic velocity expressed by the first arrivals F1–F8. This different characteristic acoustic velocity, referred to hereinafter for convenience as the "peak energy velocity", is shown approximately by line V2 which has a different slope than line V1. The difference between the peak energy velocity and the velocity of the first arrivals F1–F8 corresponds in part to dipole acoustic energy dispersion-causing characteristics of the earth formations through which the energy pulses 22 propagate.

The method of the invention uses the first arrival velocity and the peak energy velocity to calculate a first measure of dispersion of the earth formations. Determining the peak energy velocity of the formations is preferably performed using a predictive processing method described in U.S. Pat. No. 5,541,890 issued to Tang the text of which is incorporated herein by reference. The waveform 28A–28H for each receiver (14 in FIG. 1) can be synthesized by time shifting the voltage signals actually measured by the other receivers 14. Time shifting is performed by selecting values of wave velocity for each propagation mode present in the synthesized waveform. The selected acoustic velocities are adjusted until the synthesized waveform most closely matches the actual waveform (the received signal) from the particular receiver 14 under investigation. As described in the Tang '890 patent, the waveform for each receiver, $W_n(t)$, can be matched according to the expression:

$$\overline{W}_n(t) = \sum_{k=1}^{p} W_{n-1}(t - s_k d) - \sum_{k,j=1}^{p} W_{n-2}[t - (s_k + s_j)d] + \sum_{k,j,m=1}^{p} W_{n-3}[t - (s_k + s_j + s_m)d] + \ldots + (-1)^p W_{n-p}\left(t - \sum_{k=1}^{p} s_k d\right), (k < j < m) \quad (1)$$

where d represents the axial spacing between the receiver 14 and the transmitter 12, p represents the total number of propagation modes present in the waveform, and $s_k$, $s_j$, $s_m$ represent the individual values of velocity (represented herein as the inverse of velocity, called the "slowness") for each propagation mode represented in the waveform. The waveform is considered to be substantially matched when the value of the following expression is determined to be at a minimum:

$$E(s_1, s_2, \ldots s_p) = \sum_n \sum_t \|W_n(t) - \overline{W}_n(t, s_1, s_2, \ldots s_p)\| \quad (2)$$

where the difference represented in equation (2) is that between the synthesized waveform had the measured waveform (the voltage signal from the particular receiver 14). In the present case, only one propagation mode needs to be matched, so that p=1. It is to be understood that the method of determining the peak energy velocity as described in the Tang '890 patent is not an exclusive representation of methods of determining the peak energy velocity. Other methods known in the art, such as waveform synthesis in the frequency domain, can be used to determine the peak energy velocity. The method described in the Tang '890 patent, however, provides a substantial improvement in speed of performance over frequency domain methods of determining the peak energy velocity.

It is also to be understood that determination of a characteristic dispersion for the waveforms 28A–28H can be determined for any other portion of the waveforms 28A–28H subsequent to the first arrival. For example, if the peak energy velocity is substantially the same as the first arrival velocity, then a velocity corresponding to arrival times of the terminal end of each waveform 28A–28H, a so-called "last arrival", could be determined. A velocity corresponding to the peak amplitude of each waveform 28A–28H could also provide a velocity which is indicative of a dispersion characteristic of the wave. The velocity determined for the peak energy, or for any subsequent portion of the waveform, can be referred to for convenience as the "frequency dependent velocity". It is only necessary in the invention that the process used to calculate the frequency dependent velocity be consistent between the first and second portions of the method of the invention, as will be further explained.

Figure 4:
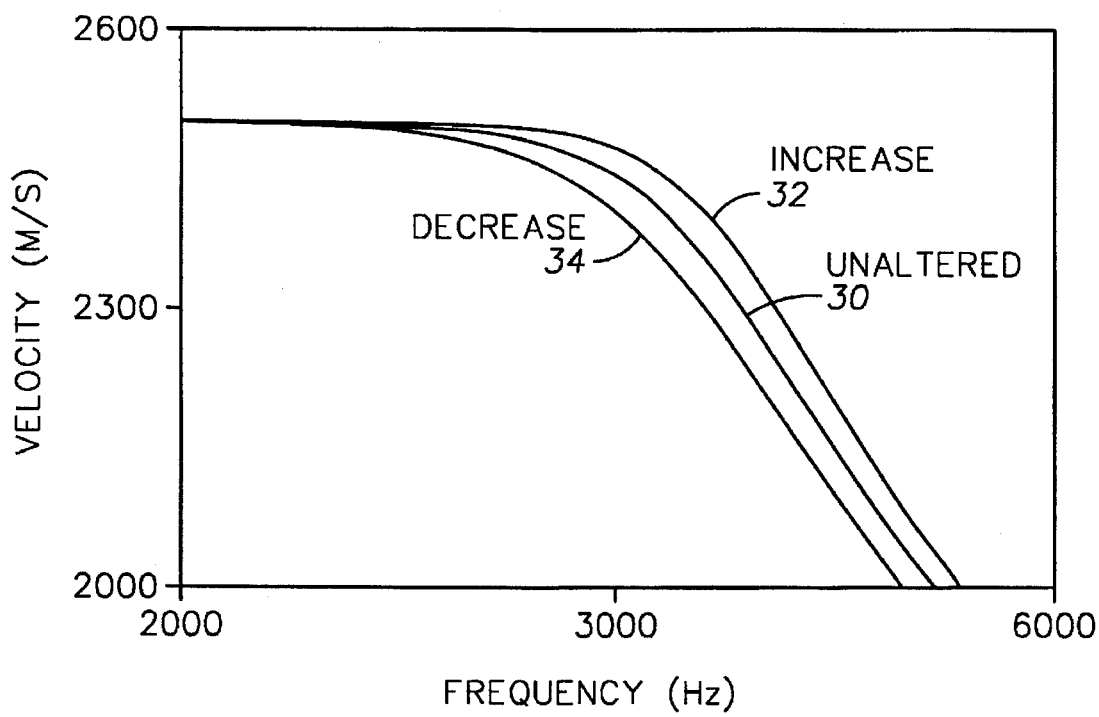
FIG. 4 is a graph showing the effects of alteration on the relationship of dipole wave velocity with respect to frequency.

As previously explained, the peak energy velocity can be different from the first arrival velocity as result of the dispersion characteristics of dipole wave traversing the earth formations along the wellbore 2. The magnitude of the difference between the first arrival velocity (shown by line V1) and the peak energy velocity (shown by line V2) can correspond to the frequency of the acoustic energy at which the voltage signals are generated. A graph showing the frequency dependence of the dispersion characteristics of dipole waves, corresponding to earth formations having alteration associated with increases or decreases of shear velocity associated therewith, can be observed by referring to FIG. 4. In FIG. 4, curve 30 shows the dipole wave velocity with respect to the frequency of the acoustic energy for a typical earth formation. It has been determined that earth formations (such as 6A in FIG. 1) which have been altered by the drilling process may have changes in dipole wave dispersion characteristics when compared with earth formations which have not been so altered. Some types of alteration of the formations, such as shown by curve 34, cause a larger dispersion in the velocity with respect to frequency than would be observed in an unaltered formation. Other types of alteration can cause the dipole wave velocity to exhibit less dispersion with respect to frequency than an unaltered formation, as shown by curve 32.

A change in the dipole wave dispersion characteristics between the earth formation present in the wellbore 2 and the dipole wave dispersion characteristics of a similar composition unaltered earth formation can be estimated according to the invention by comparing a first dispersion characteristic to a second dispersion characteristic. The first dispersion characteristic can be determined, as previously explained, by calculating the first arrival velocity and the peak energy velocity (or other frequency dependent velocity) for the earth formation 6A as actually measured by the acoustic well logging instrument (10 in FIG. 1). The second dispersion characteristic is calculated from "simulated" dipole waveforms for an earth formation which is assumed to be unaltered and has a first arrival velocity substantially equal to the first arrival velocity determined as previously described herein. The second dispersion characteristic calculation includes determining a second first arrival velocity and a second peak energy velocity (or other frequency dependent velocity) corresponding to the simulated unaltered formation. Determination of the simulated waveforms to calculate the second velocities includes generating simulated acoustic waveforms as described in X. M. Tang, E. C. Reiter and D. R. Burns, *A Dispersive-Wave Processing Technique for Estimating Formation Shear Velocity from Dipole and Stoneley Waveforms*, Geophysics, vol. 60 pp. 19–28, Society of Exploration Geophysicists, 1995. A shear wave velocity for the unaltered formation which can be used in the method described in the Tang et al reference can be the first arrival velocity, determined as previously explained. This shear wave velocity can be used to generate synthetic waveforms for the earth formation which is assumed to be unaltered. According to Tang et at, a synthetic waveform corresponding to the j-th receiver on the acoustic logging instrument can be determined from a measured waveform at receiver $z_j$ by the expression:

$$\overline{W}(V_{s0}, t, z_j) = F^{-1}\{W(\omega, z_i) \exp[ik_0(V_{s0}) \times (j-i) dz]\} \quad (3)$$

where $W(\omega, z_i)$ represents the frequency domain representation of the waveform at receiver $z_i$, j=(1, 2, 3, ..., n) and n represents the number of receivers on the instrument. $F^{-1}$ represents the inverse Fourier transform of the subsequent expression and $k_0(V_{SO})$ represents the wavenumber computed from dipole wave dispersion equation (1) in the Tang et al reference for the shear wave velocity $V_{SO}$ (approximated by the first arrival velocity of the signal waveforms 28A–28H as previously described). dz represents the axial distance between the receivers used in the simulation. Preferably this spacing should be the same as the actual spacing between the receivers (14 in FIG. 1) on the logging instrument (10 in FIG. 1) which for the instrument 10 in FIG. 1 can be about 6 inches. Other well log data which may be used in the simulation of the waveforms according to Tang et al, such as compressional velocity of the formation, bulk density of the formation and the diameter of the wellbore, may be obtained from other well known sensors (not shown) forming part of the well logging instrumentation. The receiver, $z_j$, for which the waveform is synthesized can be any receiver on the instrument. It is preferable to synthesize waveforms for every receiver on the instrument (i=1, 2, 3, . . . , n; i≠j) and to stack the synthesized waveforms to correspond to the waveform of receiver $z_j$. Stacking can improve the results by suppressing noise in the data.

After the simulated waveforms are generated using the first arrival velocity as the initial estimate of velocity, $V_{SO}$, the first arrival velocity and the peak energy velocity of the resulting simulated waveforms can be determined by once again using the waveform matching method described in the Tang '890 patent. The second dispersion characteristic can then be determined as the difference in the first arrival velocity compared with the peak energy velocity estimated from the simulated waveforms. Differences between the first dispersion characteristic and the second dispersion characteristic can indicate alteration of the earth formation.

As previously explained, any portion of the waveforms (28A–28H in FIG. 2) subsequent to the first arrival can also be used to determine a frequency dependent velocity for purposes of determining the first dispersion characteristic, particularly if the peak energy velocity is very close to the first arrival velocity. If such a subsequent portion of the waveform is used to determine the frequency dependent velocity, then a corresponding subsequent portion of the synthesized waveforms should be used to determine the frequency dependent velocity of the synthesized waveforms when determining the second dispersion characteristic.

Figure 5:
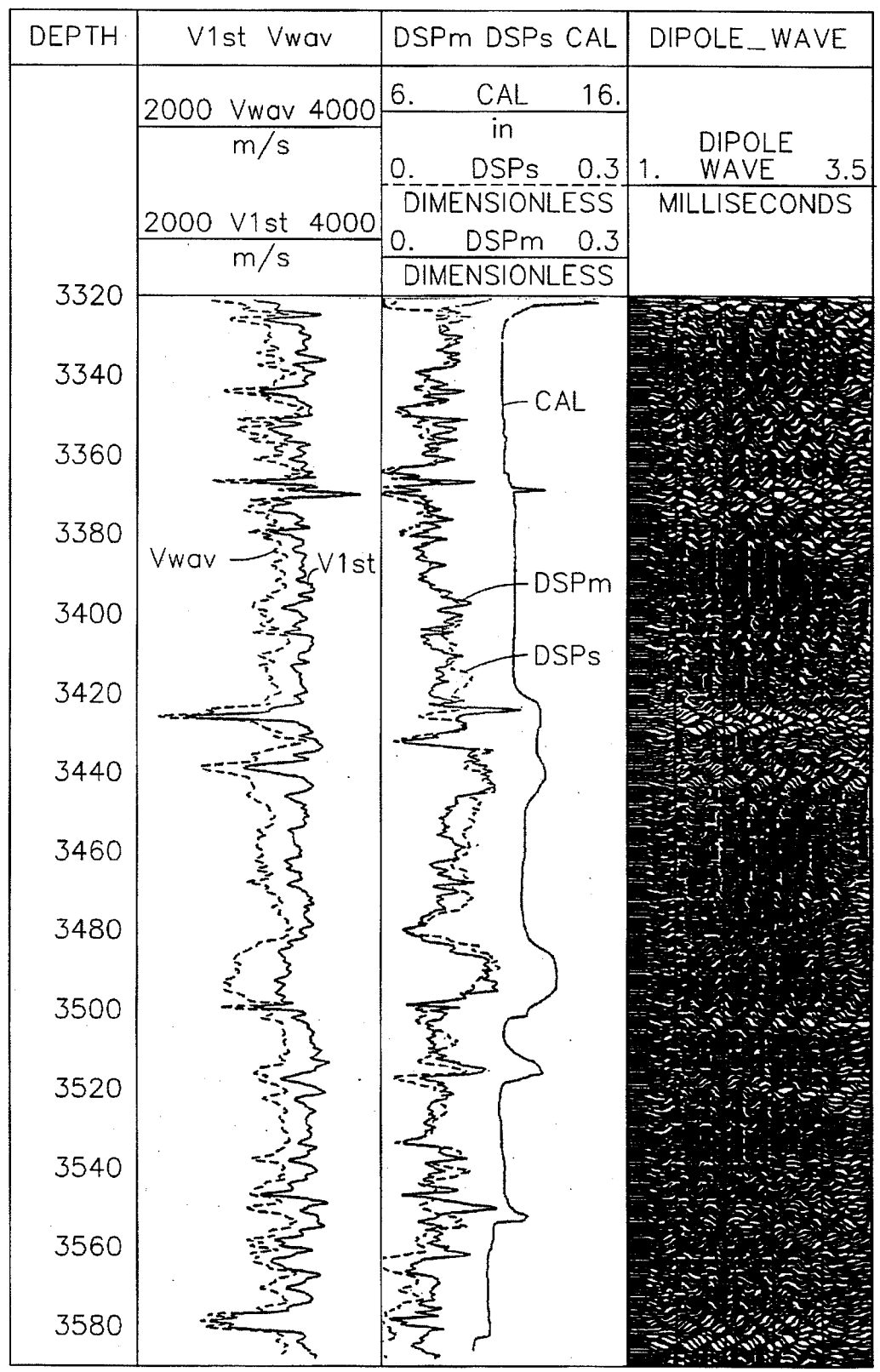
FIG. 5 is a sample well log generated using the method of the invention.

An example of a well log generated by using the method of the invention is shown in FIG. 5. Acoustic signals are recorded by inserting the instrument (10 in FIG. 1) into the wellbore 2 as previously described. Velocities which are determined from the first arrivals (F1–F8 in FIG. 2) in the voltage signal waveforms (28A–28H in FIG. 2) are shown by the curve labelled $V_{1st}$ and presented in the left-hand track of the well log in FIG. 5. The peak energy velocities are shown by the curve labelled $V_{wav}$ which is also presented in the left-hand track of the well log. A curve representing the first dispersion characteristic, calculated from the difference between the first arrival and the peak energy velocities, is shown in the center track as curve $DSP_m$. Using the first arrival velocities as the estimate of shear velocity of the unaltered formation, the second dispersion characteristic can be calculated as previously explained. The second dispersion characteristic is shown by curve $DSP_s$ presented in the center track of the well log. For reference, voltage signal waveforms (such as 28A in FIG. 2) from a single receiver (14 in FIG. 1) are shown in the right-hand track of the well log. The center track includes a caliper curve CAL which is a measurement of the diameter of the wellbore (2 in FIG. 1). Zones which may be subject to alteration and possible mechanical instability of the wall of the wellbore are indicated by differences between the curves $DSP_m$ and $DSP_s$. Such zones are particularly visible, for example, at indicated depths of 3340–3350, 3420, 3550 and below 3560 meters on the well log in FIG. 5.

Those skilled in the art will readily devise other embodiments of the invention which do not depart from the spirit of the invention described herein. Accordingly, the invention should by limited in scope only by the attached claims.

What is claimed is:

1. A method for detecting alteration of earth formations penetrated by a wellbore, comprising:

determining a first arrival velocity and a frequency-dependent velocity of dipole acoustic energy propagated through said earth formations;

calculating a first dispersion characteristic related to a difference between said first arrival velocity and said frequency dependent velocity;

determining a frequency dependent velocity and a first arrival velocity for an unaltered earth formation by synthesizing waveforms of said dipole acoustic energy using said first arrival velocity for a shear velocity;

calculating a second dispersion characteristic related to a difference between said frequency dependent velocity and said first arrival velocity of said unaltered earth formation; and detecting said alteration by finding whether a difference exists between said first dispersion characteristic and said second dispersion characteristic.

2. The method as defined in claim 1 wherein said frequency dependent velocity comprises a peak energy velocity.

3. The method as defined in claim 2 wherein said step of determining said frequency-dependent velocity comprises processing signals from an array acoustic wellbore logging tool including a transmitter and a plurality of receivers axially spaced apart from said transmitter, processing said signals comprising:

synthesizing a signal to correspond to a first one of said plurality of receivers, said step of synthesizing including time-shifting signals received at a second and a third one of said plurality of receivers in response to said acoustic energy imparted to said earth formation by said transmitter, said time-shifting performed by an amount of time corresponding to a selected value of velocity for a selected propagation mode of said acoustic energy and an axial distance between said second one and said first one of said receivers and axial distance between said third one and said first one of said receivers, said step of synthesizing including summing said time-shifted signals;

comparing said synthesized signal to a signal generated by said first receiver in response to said acoustic energy propagated through said wellbore so as to determine a degree of correspondence between said synthesized signal and said generated signal;

varying said selected value of velocity, repeating said step of synthesizing said signals and said step of comparing until said degree of correspondence reaches a maximum, thereby determining said frequency-dependent velocity.

4. The method as defined in claim 3 wherein said step of comparing comprises generating an object function of said difference between said generated signal at said first receiver and said synthesized signal.

5. The method as defined in claim 1 wherein said frequency dependent velocity comprises a peak amplitude velocity.

6. A method for detecting changes in acoustic energy dispersion properties of an earth formation penetrated by a wellbore comprising:

inserting an acoustic wellbore logging tool into said wellbore, said tool comprising a dipole transmitter and a plurality of receivers axially spaced apart from said transmitter;

periodically actuating said transmitter to energize said earth formation with dipole acoustic energy;

receiving signals at said plurality of receivers in response to said dipole acoustic energy traversing said wellbore and said earth formation;

determining a peak energy velocity of said dipole acoustic energy, wherein said step of determining said peak energy velocity comprises, a) synthesizing a signal to correspond to a first one of said receivers, said step of synthesizing including time-shifting signals received at a second and a third one of said receivers in response to said acoustic energy imparted by said transmitter, said time-shifting performed by an amount of time corresponding to a selected value of velocity for said dipole acoustic energy and an axial distance between said second one and said first one of said receivers and an axial distance between said third one and said first one of said receivers, said step of synthesizing including summing said time shifted signals, b) comparing said synthesized signal to a signal generated by said first receiver in response to said dipole acoustic energy so as to determining a degree of correspondence between said synthesized signal and said generated signal, and c) varying said selected value of velocity, repeating said step of synthesizing signals and said step of comparing until said degree of correspondence reaches a maximum;

determining a first arrival velocity of said dipole energy;

determining a first dispersion characteristic related to a difference between said first arrival velocity and said peak energy velocity of said dipole acoustic energy;

determining a peak energy velocity and a first arrival velocity of synthesized waveforms of said dipole acoustic energy, said synthesized waveforms generated using said first arrival velocity of said dipole acoustic energy for a shear velocity of said formation;

calculating a second dispersion characteristic related to a difference between said peak energy velocity and said first arrival velocity of said synthesized waveforms; and detecting said changes in said dispersion properties by finding a difference between said first dispersion characteristic and said second dispersion characteristic.

7. The method as defined in claim 6 wherein said step of comparing comprises generating an object function of said difference between said generated signal at said first receiver and said synthesized signal.

* * * * *